United States Patent
Kumar et al.

(10) Patent No.: US 12,505,112 B2
(45) Date of Patent: Dec. 23, 2025

(54) CONTENT RELEVANCE BASED TABLE QUERY ANSWERING

(71) Applicant: Adobe Inc., San Jose, CA (US)

(72) Inventors: Yaman Kumar, New Delhi (IN); Sumit Bhatia, New Delhi (IN); Milan Aggarwal, Pitampura (IN); Balaji Krishnamurthy, Noida (IN); Sohan Patnaik, Bhubaneswar (IN); Heril Changwal, Udaipur (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/674,598

(22) Filed: May 24, 2024

(65) Prior Publication Data

US 2025/0363120 A1    Nov. 27, 2025

(51) Int. Cl.
G06F 16/2457    (2019.01)
G06F 16/248    (2019.01)
G06F 40/205    (2020.01)
G06F 40/284    (2020.01)

(52) U.S. Cl.
CPC ...... *G06F 16/24578* (2019.01); *G06F 16/248* (2019.01); *G06F 40/205* (2020.01); *G06F 40/284* (2020.01)

(58) Field of Classification Search
CPC ................................................ G06F 16/24578
See application file for complete search history.

(56) References Cited

U.S. PATENT DOCUMENTS

2016/0012052 A1*  1/2016  Zoryn ............... G06F 16/24578
                                                              707/728

OTHER PUBLICATIONS

Aly, Rami et al., "FEVEROUS: Fact Extraction and VERification Over Unstructured and Structured information", Cornell University arXiv, arXiv.org [retrieved Aug. 18, 2024]. Retrieved from the Internet <https://arxiv.org/pdf/2106.05707>, 2021, 32 pages.

Brown, Tom et al., "Language Models are Few-Shot Learners", Advances in Neural Information Processing Systems [retrieved Mar. 27, 2023]. Retrieved from the Internet <https://armatech.us/OpenLanding/Language%20Models%20are%20Few-Shot%20Learners.pdf>., Jul. 22, 2020, 25 Pages.

Chen, Jiawei et al., "Benchmarking Large Language Models in Retrieval-Augmented Generation", Cornell University arXiv, arXiv.org [retrieved Aug. 18, 2024]. Retrieved from the Internet <https://arxiv.org/pdf/2309.01431>, 2023, 9 pages.

Chen, Mark et al., "Evaluating Large Language Models Trained on Code", Cornell University arXiv, arXiv.org [retrieved Aug. 18, 2024]. Retrieved from the Internet <https://arxiv.org/pdf/2107.03374>, 2021, 35 pages.

(Continued)

*Primary Examiner* — Truong V Vo
(74) *Attorney, Agent, or Firm* — FIG. 1 Patents

(57) ABSTRACT

Content relevance based table query answering is described. In one or more examples, a query and a table are received. The table includes a plurality of cells. A plurality of scores for calculated that correspond to the plurality of cells based on the query. One or more machine-learning models are then leveraged to generate a search result from the query, table, and scores, which is presented in a user interface for display.

20 Claims, 7 Drawing Sheets

(56) References Cited

OTHER PUBLICATIONS

Chen, Nuo et al., "Bridge the Gap between Language models and Tabular Understanding", Cornell University arXiv, arXiv.org [retrieved Aug. 18, 2024]. Retrieved from the Internet <https://arxiv.org/pdf/2302.09302>, 2023, 7 pages.

Chen, Wenhu, "Large Language Models are few(1)-shot Table Reasoners", Cornell University arXiv, arXiv.org [retrieved Aug. 18, 2024]. Retrieved from the Internet <https://arxiv.org/pdf/2210.06710>, 2023, 11 pages.

Chen, Wenhu, "Logical Natural Language Generation from Open-Domain Tables", In Proceedings of the 58th Annual Meeting of the Association for Computational Linguistics, Retrieved from the Internet Aug. 18, 2024 <https://aclanthology.org/2020.acl-main.708.pdf>, 2020, pp. 7929-7942.

Chen, Wenhu et al., "TABFACT: a Large-Scale Dataset for Tablebased Fact Verification", Cornell University arXiv, arXiv.org [retrieved Aug. 18, 2024]. Retrieved from the Internet <https://arxiv.org/pdf/1909.02164>, 2020, 25 pages.

Chen, Zhiyu et al., "CONVFINQA: Exploring the Chain of Numerical Reasoning in Conversational Finance Question Answering", In Proceedings of the 2022 Conference on Empirical Methods in Natural Language Processing, Retrieved from the Internet Aug. 18, 2024]<https://aclanthology.org/2022.emnlp-main.421.pdf>, Dec. 2022, pp. 6279-6292.

Chen, Zhiyu et al., "Logic2Text: High-Fidelity Natural Language Generation from Logical Forms", In Findings of the Association for Computational Linguistics: EMNLP, Retrieved from the Internet Aug. 18, 2024 <https://aclanthology.org/2020.findings-emnlp.190.pdf>, 2020, pp. 2096-2111.

Cheng, Zhoujun et al., "Binding Language Models in Symbolic Languages", Cornell University arXiv, arXiv.org [retrieved Aug. 18, 2024]. Retrieved from the Internet <https://arxiv.org/pdf/2210.02875>, 2023, 27 pages.

Cheng, Zhoujun et al., "HiTab: A Hierarchical Table Dataset for Question Answering and Natural Language Generation", In Proceedings of the 60th Annual Meeting of the Association for Computational Linguistics, [retrieved Aug. 18, 2024]. Retrieved from the Internet <https://aclanthology.org/2022.acl-long.78.pdf>, 2022, pp. 1094-1110.

Chung, Hyung W. et al., "Scaling instruction-finetuned language models", Cornell University, arXiv Preprint, arxiv.org <1 of 2>, Oct. 20, 2022, 54 pages.

Chung, Hyung W. et al., "Scaling Instruction-Finetuned Language Models", Cornell University, arXiv Preprint, arxiv.org <2 of 2>, Oct. 20, 2022, 54 pages.

Deng, Xiang et al., "TURL: Table Understanding through Representation Learning", ACM SIGMOD Record, vol. 51 No. 1 [retrieved Aug. 17, 2022]. Retrieved from the Internet <http://www.vldb.org/pvldb/vol14/p307-deng.pdf>., Jun. 1, 2022, 13 Pages.

Devlin, Jacob et al., "BERT: Pre-Training of Deep Bidirectional Transformers for Language Understanding", Cornell University, arXiv Preprint, arXiv.org [retrieved on Jun. 14, 2023]. Retrieved from the Internet <https://arxiv.org/pdf/1810.04805.pdf>., May 24, 2019, 16 pages.

Eisenschlos, Julian et al., "MATE: Multi-view Attention for Table Transformer Efficiency", In Proceedings of the 2021 Conference on Empirical Methods in Natural Language Processing, [retrieved Aug. 18, 2024]. Retrieved from the Internet <https://aclanthology.org/2021.emnlp-main.600.pdf>, Nov. 2021, pp. 7606-7619.

Eisenschlos, Julian et al., "Understanding tables with intermediate pre-training", In Findings of the Association for Computational Linguistics [retrieved Aug. 18, 2024]. Retrieved from the Internet <https://aclanthology.org/2020.findings-emnlp.27.pdf>, 2020, pp. 281-296.

Garg, Siddhant et al., "TANDA: Transfer and Adapt Pre-Trained Transformer Models for Answer Sentence Selection", In Proceedings of the AAAI conference on artificial intelligence, vol. 34, 2020, pp. 7780-7788.

Gu, Zihui et al., "PASTA: Tableoperations aware fact verification via sentence-table cloze pre-training", In Proceedings of the 2022 Conference on Empirical Methods in Natural Language Processing, [retrieved Aug. 18, 2024]. Retrieved from the Internet <https://aclanthology.org/2022.emnlp-main.331.pdf>, 2022, pp. 4971-4983.

Han, Hongwei et al., "LUNA: Language Understanding with Number Augmentations on Transformers via Number Plugins and Pre-training", Cornell University arXiv, arXiv.org [retrieved Aug. 18, 2024]. Retrieved from the Internet <https://arxiv.org/pdf/2212.02691>, 2023, 12 pages.

He, Pengcheng et al., "DEBERTAV3: Improving Deberta Using Electra-Style Pre-Training With Gradientdisentangled Embedding Sharing", Cornell University arXiv, arXiv.org [retrieved Aug. 18, 2024]. Retrieved from the Internet <https://arxiv.org/pdf/2111.09543>, 2023, 16 pages.

Herzig, Jonathan et al., "TaPas: Weakly Supervised Table Parsing via Pretraining", Cornell University arXiv, arXiv.org [retrieved Aug. 17, 2022]. Retrieved from the Internet <https://arxiv.org/pdf/2004.02349.pdf>., Apr. 21, 2020, 14 Pages.

Iyer, Roshni et al., "Question-Answer Sentence Graph for Joint Modeling Answer Selection", Proceedings of the 17th Conference of the European Chapter of the Association for Computational Linguistics [retrieved Aug. 18, 2024]. Retrieved from the Internet <https://aclanthology.org/2023.eacl-main.68.pdf>, May 2023, pp. 968-979.

Jiang, Jinhao et al., "StructGPT: A General Framework for Large Language Model to Reason over Structured Data", Cornell University arXiv, arXiv.org [retrieved Aug. 18, 2024]. Retrieved from the Internet <https://arxiv.org/pdf/2305.09645>, 2023, 15 pages.

Jiang, Zhengbao et al., "OmniTab: Pretraining with Natural and Synthetic Data for Few-shot Table-based Question Answering", In Proceedings of the 2022 Conference of the North American Chapter of the Association for Computational Linguistics: Human Language Technologies, [retrieved Aug. 18, 2024]. Retrieved from the Internet <https://aclanthology.org/2022.naacl-main.68.pdf>, 2022, pp. 932-942.

Krichene, Syrine et al., "DoT: An efficient Double Transformer for NLP tasks with tables", In Findings of the Association for Computational Linguistics: ACLIJCNLP, [retrieved Aug. 18, 2024]. Retrieved from the Internet <https://aclanthology.org/2021.findings-acl.289.pdf>, Aug. 2021, pp. 3273-3283.

Kumar, Vishwajeet et al., "Multi-Row, Multi-Span Distant Supervision for Table+Text Question Answering", In Proceedings of the 61st Annual Meeting of the Association for Computational Linguistics, [retrieved Aug. 18, 2024]. Retrieved from the Internet <https://aclanthology.org/2023.acl-long.449.pdf>, Jul. 2023, pp. 8080-8094.

Lei, Fangyu et al., "S3HQA: A Three-Stage Approach for Multi-hop Text-Table Hybrid Question Answering", In Proceedings of the 61st Annual Meeting of the Association for Computational Linguistics (vol. 2: Short Papers), [retrieved Aug. 18, 2024]. Retrieved from the Internet <https://aclanthology.org/2023.acl-short.147.pdf>, Jul. 2023, pp. 1731-1740.

Lewis, Mike et al., "BART: Denoising Sequence-to-Sequence Pre-training for Natural Language Generation, Translation, and Comprehension", Cornell University arXiv, arXiv.org [retrieved Mar. 23, 2023]. Retrieved from the Internet <https://arxiv.org/pdf/1910.13461.pdf>., Oct. 29, 2019, 10 Pages.

Liu, Qian et al., "TAPEX: Table Pre-Training via Learning a Neural SQL Executor", Cornell University arXiv, arXiv.org [retrieved Aug. 18, 2024]. Retrieved from the Internet <https://arxiv.org/pdf/2107.07653>, 2022, 19 pages.

Loshchilov, Ilya et al., "Decoupled Weight Decay Regularization", Cornell University arXiv, arXiv.org [retrieved Aug. 9, 2023]. Retrieved from the Internet <https://arxiv.org/pdf/1711.05101.pdf>., Jan. 4, 2019, 19 Pages.

Loshchilov, Ilya et al., "SGDR: Stochastic Gradient Descent with Warm Restarts", In International Conference on Learning Representations, May 3, 2017, 16 pages.

Nakamura, Kai et al., "HYBRIDIALOGUE: An Information-Seeking Dialogue Dataset Grounded on Tabular and Textual Data", In Findings of the Association for Computational Linguistics: ACL, [retrieved Aug. 18, 2024]. Retrieved from the Internet <https://aclanthology.org/2022.findings-acl.41.pdf>, 2022, pp. 481-492.

(56) References Cited

OTHER PUBLICATIONS

Nan, Linyong et al., "DART: Open-Domain Structured Data Record to Text Generation", In Proceedings of the 2021 Conference of the North American Chapter of the Association for Computational Linguistics: Human Language Technologies, [retrieved Aug. 18, 2024]. Retrieved from the Internet <https://aclanthology.org/2021.naacl-main.37.pdf>, Jun. 2021, pp. 432-447.

Nan, Linyong et al., "FeTaQA: Free-form Table Question Answering", Transactions of the Association for Computational Linguistics, [retrieved Aug. 18, 2024]. Retrieved from the Internet <file:///C:/Users/Laptop%2003/Downloads/FeTaQA_Free-form_Table_Question_Answering.pdf>, 2022, pp. 35-49.

Neeraja, J. et al., "Incorporating External Knowledge to Enhance Tabular Reasoning", In Proceedings of the 2021 Conference of the North American Chapter of the Association for Computational Linguistics: Human Language Technologies, [retrieved Aug. 18, 2024]. Retrieved from the Internet <https://aclanthology.org/2021.naacl-main.224.pdf>, Jun. 2021, pp. 2799-2809.

Ni, Ansong et al., "LEVER: Learning to Verify Language-to-Code Generation with Execution", Cornell University arXiv, arXiv.org [retrieved Aug. 18, 2024]. Retrieved from the Internet <https://arxiv.org/pdf/2302.08468>, 2023, 23 pages.

Pal, Vaishali et al., "Parameter-Efficient Abstractive Question Answering over Tables or Text", In Proceedings of the Second DialDoc Workshop on Document-grounded Dialogue and Conversational Question Answering, [retrieved Aug. 18, 2024]. Retrieved from the Internet <https://aclanthology.org/2022.dialdoc-1.5.pdf>, May 2022, pp. 41-53.

Parikh, Ankur et al., "ToTTo: A Controlled Table-To-Text Generation Dataset", In Proceedings of the 2020 Conference on Empirical Methods in Natural Language Processing (EMNLP), [retrieved Aug. 18, 2024]. Retrieved from the Internet <https://aclanthology.org/2020.emnlp-main.89.pdf>, Nov. 2020, pp. 1173-1186.

Pasupat, Panupong et al., "Compositional Semantic Parsing on Semi-Structured Tables", Cornell University arXiv, arXiv.org [retrieved Aug. 18, 2024]. Retrieved from the Internet <https://arxiv.org/pdf/1508.00305>, 2015, 11 pages.

Pi, Xinyu et al., "Towards Robustness of Text-to-SQL Models Against Natural and Realistic Adversarial Table Perturbation", In Proceedings of the 60th Annual Meeting of the Association for Computational Linguistics (vol. 1: Long Papers), [retrieved Aug. 18, 2024]. Retrieved from the Internet <https://aclanthology.org/2022.acl-long.142.pdf>, May 2022, pp. 2007-2022.

Post, Matt, "A Call for Clarity in Reporting BLEU Scores", In Proceedings of the Third Conference on Machine Translation: Research Papers, [retrieved Aug. 18, 2024]. Retrieved from the Internet <https://aclanthology.org/W18-6319.pdf>, Oct. 2018, pp. 186-191.

Raffel, Colin et al., "Exploring the Limits of Transfer Learning with a Unified Text-to-Text Transformer", Cornell University arXiv, arXiv.org [retrieved Jul. 12, 2023]. Retrieved from the Internet <https://arxiv.org/pdf/1910.10683.pdf>., Jul. 28, 2020, 67 Pages.

Srivastava, Akash et al., "Autoencoding Variational Inference for Topic Models", Cornell University arXiv, arXiv.org [retrieved Aug. 18, 2024]. Retrieved from the Internet <https://arxiv.org/pdf/1703.01488>, 2017, 12 pages.

Suadaa, Lya et al., "Towards Table-to-Text Generation with Numerical Reasoning", In Proceedings of the 59th Annual Meeting of the Association for Computational Linguistics, [retrieved Aug. 18, 2024]. Retrieved from the Internet <https://aclanthology.org/2021.acl-long.115.pdf>, Aug. 2021, pp. 1451-1465.

Van Der Maaten, Laurens et al., "Visualizing Data using t-SNE", Journal of Machine Learning Research, Nov. 2008, 25 pages.

Wang, Xuezhi et al., "Self-Consistency Improves Chain of Thought Reasoning in Language Models", Cornell University arXiv, arXiv.org [retrieved Aug. 18, 2024]. Retrieved from the Internet <https://arxiv.org/pdf/2203.11171>, 2023, 24 pages.

Wang, Yingyao et al., "MuGER2 : Multi-Granularity Evidence Retrieval and Reasoning for Hybrid Question Answering", In Findings of the Association for Computational Linguistics: EMNLP 2022, [retrieved Aug. 18, 2024]. Retrieved from the Internet <https://aclanthology.org/2022.findings-emnlp.498.pdf>, 2022, pp. 6687-6697.

Wei, Jason et al., "Chain-of-Thought Prompting Elicits Reasoning in Large Language Models", Cornell University arXiv, arXiv.org [retrieved Aug. 18, 2024]. Retrieved from the Internet <https://arxiv.org/pdf/2201.11903>, 2023, 43 pages.

Xie, Tianbao et al., "UNIFIEDSKG: Unifying and Multi-Tasking Structured Knowledge Grounding with Text-to-Text Language Models", In Proceedings of the 2022 Conference on Empirical Methods in Natural Language Processing, [retrieved Aug. 18, 2024]. Retrieved from the Internet <https://aclanthology.org/2022.emnlp-main.39.pdf>, Dec. 2022, pp. 602-631.

Yang, Jingfeng et al., "TABLEFORMER: Robust Transformer Modeling for Table-Text Encoding", In Proceedings of the 60th Annual Meeting of the Association for Computational Linguistics (vol. 1: Long Papers), [retrieved Aug. 18, 2024]. Retrieved from the Internet <https://aclanthology.org/2022.acl-long.40.pdf>, May 2022, pp. 528-537.

Ye, Yunhu et al., "Large Language Models are Versatile Decomposers: Decompose Evidence and Questions for Table-based Reasoning", Cornell University arXiv, arXiv.org [retrieved Aug. 18, 2024]. Retrieved from the Internet <https://arxiv.org/pdf/2301.13808>, 2023, 16 pages.

Yin, Pengcheng et al., "TaBERT: Pretraining for Joint Understanding of Textual and Tabular Data", Cornell University arXiv, arXiv.org [retrieved Aug. 18, 2022]. Retrieved from the Internet <https://arxiv.org/pdf/2005.08314.pdf>., Apr. 1, 2022, 15 Pages.

Yu, Tao et al., "Grappa: Grammar-Augmented Pre-Training for Table Semantic Parsing", Cornell University arXiv, arXiv.org [retrieved Aug. 18, 2024]. Retrieved from the Internet <https://arxiv.org/pdf/2009.13845>, 2021, 16 pages.

Zhang, Zeyu et al., "Joint Models for Answer Verification in Question Answering Systems", Proceedings of the 59th Annual Meeting of the Association for Computational Linguistics, [retrieved Aug. 18, 2024]. Retrieved from the Internet <https://aclanthology.org/2021.acl-long.252.pdf>, Aug. 2021, pp. 3252-3262.

Zhao, Yilun et al., "REASTAP: Injecting Table Reasoning Skills During Pre-training via Synthetic Reasoning Examples", In Proceedings of the 2022 Conference on Empirical Methods in Natural Language Processing, [retrieved Aug. 18, 2024]. Retrieved from the Internet <https://aclanthology.org/2022.emnlp-main.615.pdf>, Dec. 2022, pp. 9006-9018.

Zhao, Yilun et al., "ROBUT: A Systematic Study of Table QA Robustness Against Human-Annotated Adversarial Perturbations", Cornell University arXiv, arXiv.org [retrieved Aug. 18, 2024]. Retrieved from the Internet <https://ar5iv.labs.arxiv.org/html/2306.14321>, 2023, 18 pages.

Zhong, Victor et al., "SEQ2SQL: Generating Structured Queries From Natural Language Using Reinforcement Learning", Cornell University arXiv, arXiv.org [retrieved Aug. 18, 2024]. Retrieved from the Internet <https://arxiv.org/pdf/1709.00103>, 2017, 12 pages.

Zhou, Fan et al., "TACUBE: Pre-computing Data Cubes for Answering Numerical-Reasoning Questions over Tabular Data", In Proceedings of the 2022 Conference on Empirical Methods in Natural Language Processing, [retrieved Aug. 18, 2024]. Retrieved from the Internet <https://aclanthology.org/2022.emnlp-main.145.pdf>, Dec. 2022, pp. 2278-2291.

* cited by examiner

CONTENT RELEVANCE BASED TABLE QUERY ANSWERING

BACKGROUND

Machine-learning models have been developed to expand functionality made available by computing devices. Conventional search techniques, for instance, are based on a keyword search in which terms in a query are matched to find items having those terms as part of a search result. Machine-learning models have expanded this functionality to infer an understanding of an intent behind a query in order to perform the search.

However, conventional techniques that have been developed to employ machine-learning models as part of search fail when confronted by some types of digital content, an example of which includes tables. This failure often results in inaccurate results and inefficient use of computational resources in generating the results.

SUMMARY

Content relevance-based table query answering is described. In one or more examples, a query and a table are received. The query, for instance, specifies a question that is to be answered by a search result generated by a search of a table that includes a plurality of cells. A plurality of scores is calculated that correspond to the plurality of cells based on the query. The scores quantify a comparative amount of relevance of content included in the cells to the query. In one or more examples, the scores are based on relevance scores quantifying relevance of content included in respective cells, statement scores as a predictor of content relevancy, and so forth. One or more machine-learning models are then leveraged to generate a search result from the query, table, and scores, which is presented in a user interface for display. As a result, the scores focus operation of the machine-learning models on relevant content and suppress an effect of potentially irrelevant content and resulting noise on generation of the search result, thereby improving operation of the machine-learning models.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
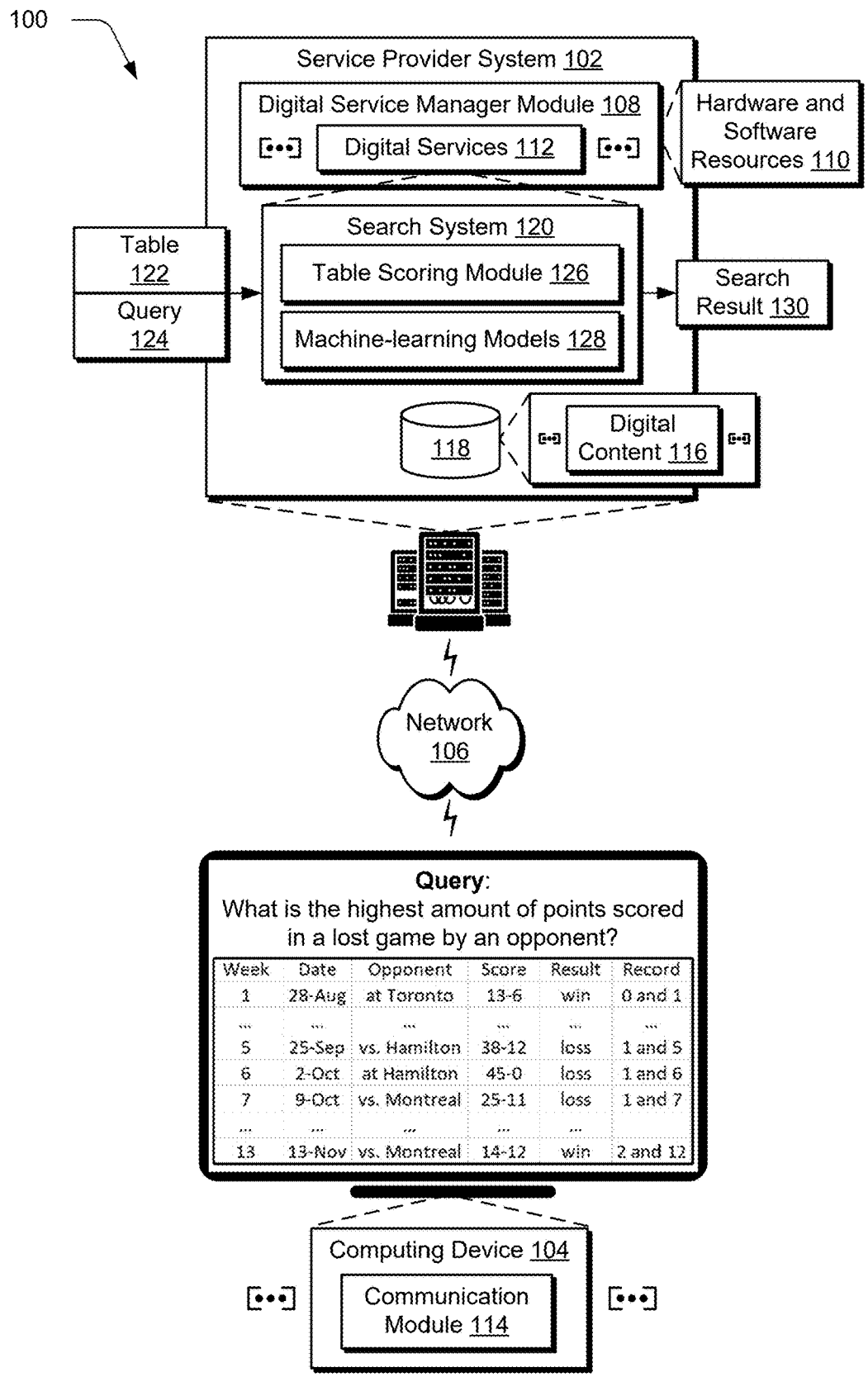
FIG. 1 is an illustration of a digital medium environment in an example implementation that is operable to employ search techniques in support of question answering for tables as described herein.

Machine-learning models have been developed to support search as a basis for a variety of functionalities made available by a computing device. An example of these functionalities includes question answering, in which, a query is processed by a machine-learning model to generate a search result as an answer to a question posed by the query. Although large language models (LLMs) have been developed to expand functionality made available by machine-learning models as part of search, large language models encounter numerous technical challenges when confronted with some types of digital content, an example of which includes tables.

Tables are formed using a plurality of cells that are generally arranged in rows and/or columns. The tables may further include headers and other metadata that supply identifying information of a type of content included in respective collections of cells, e.g., rows and/or columns. In practice, however, a relatively small portion of a table is relevant in generating a search result as an answer to a question posed by a search query. Consequently, irrelevant parts of the table act as distracting information when processed by the LLMs, resulting in suboptimal performance and inaccuracies due to the vulnerability of the LLMs to noise. Further, conventional LLMs are incapable of addressing a structure of a table nor underlying compositionality of content included in the table.

Although conventional techniques have been developed to address some of these technical challenges, these techniques typically involve pruning of content from the table. Pruning of the content, however, removes content from consideration and therefore reduces accuracy in generation of a search result and thus accuracy in an answer to a question defined by a query.

Accordingly, table query answering techniques and systems are described that leverage content relevance to address these and other technical challenges to improve accuracy in generating a search result based on a table as an answer to a question defined by a query. These techniques, for instance, are performable to generate a score for cells of a table that is a subject of a query. The scores quantify a comparative amount of relevance of content included in the cells to the query.

The scores are therefore usable to weigh corresponding content that is then passed to one or more machine-learning models (e.g., an LLM) to generate a search result as an answer to the query. As a result, the scores focus operation of the machine-learning models on relevant content and suppress an effect of potentially irrelevant content and resulting noise on generation of the search result. Therefore, accuracy of the search result is improved through an ability to process content of the table as a whole and thus avoid inaccuracies of conventional techniques.

In one or more examples, a query is received along with a table having a plurality of cells by a search system. The query, for instance, may pose a question of "what is the highest average temperature in the middle of May in San Jose over the past half decade for cloudy days." A table is also input having values of weather parameters for a variety of cities in the Northern California area.

In response, the search system calculates a plurality of scores, respectively, for the plurality of cells based on the query. The plurality of scores are usable to quantify an amount of respective relevance that content in the cells has to the query. In this way, the search system provides a framework for table question answering that weighs different table parts based on relevance to the question without removal of content.

To do so in an at least one example, the search system begins by flattening (e.g., "linearizing") the table and embedding the linearized table along with the query in an embedding space. The search system, for instance, generates a plurality of table tokens by tokenizing content of the cells of the table and a query token by tokenizing the query in the embedding space. To do so, the search system is configurable to employ an embedding layer of a large language model to embed the table tokens along with the query tokens in a sequence in accordance with the embedding space.

The sequence is then passed to a relevance scoring module to generate a relevance score for the cells by comparing the query token with the respective table tokens for the cells within the embedding space. The relevance scoring module, in one or more examples, is configured to cluster table tokens as relevant and non-relevant based on the scores.

The search system also employs a statement scoring module to generate a statement score for the cells of the table. The statement scoring module, for instance, is configurable to generate a parsing statement that describes criteria relevant to deriving the search result as an answer to the query. The statement scoring module is then configured to generate the statement score for respective cells based on relevance of content in the cells to the parsing statement.

The search system is then configurable to generate the score for the cell by combining the relevance score with the statement score for the cells, which is usable to weight content for the respective cells. The table, scores, and query are passed as an input to a machine-learning model (e.g., large language model) to generate a search result as an answer to the question posed by the query.

The scores are therefore usable to weigh corresponding content by the machine-learning model (e.g., the large language model) to generate the search result as an answer to the query. As a result, the scores focus operation of the machine-learning model on relevant content and suppress an effect of potentially irrelevant content and resulting noise on generation of the search result. In this way, accuracy of the search result is improved through an ability to process content of the table as a whole as well as address susceptibility of large language models to noise. Further discussion of these and other examples is included in the following sections and shown in corresponding figures.

Term Examples

A "machine-learning model" refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

A "large language model" (LLM) is a type of machine-learning model that is designed to understand, generate, and interact with human language inputs at a large scale. These machine-learning models are trained on vast amounts of text data using deep learning techniques (e.g., neural networks) to learn patterns, nuances, and the structure of language. The use of the term "large" refers to both the size of the training data and also to the complexity and scale of the neural networks, which may include billions or even trillions of parameters.

Large language models are configurable to perform a wide range of language-related tasks without being explicitly programmed for each one. Examples of these tasks include text generation, translation, summarization, question answering, sentiment analysis, and natural language processing. To train a large language model, the underlying machine-learning model is provided with training data that includes examples of text to train and retrain the model to predict a next word in a sequence. Over time, the model, once trained, is configured to generate text that is coherent and contextually relevant, is configurable to mimic a style and content of the training data, and so forth. In this way, large language models provide a foundational tool in artificial intelligence for understanding and generating human language, powering a wide range of applications from conversational agents to content creation tools.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Table Query Answering Environment

FIG. 1 is an illustration of a digital medium environment 100 in an example implementation that is operable to employ search techniques in support of question answering for tables as described herein. The illustrated environment 100 includes a service provider system 102 and a computing device 104 that are communicatively coupled, one to another, via a network 106. Computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" for the service provider system 102 and as further described in relation to FIG. 7.

The service provider system 102 includes a digital service manager module 108 that is implemented using hardware and software resources 110 (e.g., a processing device and computer-readable storage medium) in support one or more digital services 112. Digital services 112 are made available, remotely, via the network 106 to computing devices, e.g., computing device 104.

Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access the one or more digital services 112 via the network 106. A result of processing using the digital services 112 is then returned to the computing device 104 via the network 106. The service provider system 102 is also configured to maintain digital content 116, which is illustrated as stored in a storage device 118. Examples of digital content 116 include a digital image, digital document, digital media, and so forth.

In the illustrated example, the digital services 112 are utilized to implement a search system 120. The search system 120 is configured to take, as an input, a table 122 and a query 124. The search system 120 then employs a table scoring module 126 and one or more machine-learning models 128 to generate a search result 130 as an answer to a question posed by the query 124. The search system 120, therefore, is configurable to implement question/answer functionality to generate an answer as a search result 130 to a question posed by the query 124 based on the table 122.

The search system 120, through use of the table scoring module 126, is configured to focus on content relevant to the query 124 and suppress extraneous information. To do so, the table scoring module 126 is utilized to generate scores based on relevance of content within cells of the table 122 to the query.

In an implementation, each cell of the table 122 is assigned a score by the table scoring module 126, which is then passed to the one or more machine-learning models 128 along with the query 124 to generate the search result 130. In this way, the scores provide a weighting to the respective cells, and thus are usable to control focus given to respective cells (and more particularly content within the cells) during operation of the one or more machine-learning models 128.

As a result, the scores support focus towards potentially relevant content by the one or more machine-learning models 128 while still maintaining access to an entirety of the content included in cells of the table 122. The search system 120 thus overcomes and addresses challenges of conventional techniques with increased accuracy and reduced computational resource consumption as a result of this accuracy. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Content Relevance Based Table Query Answering

Figure 6:
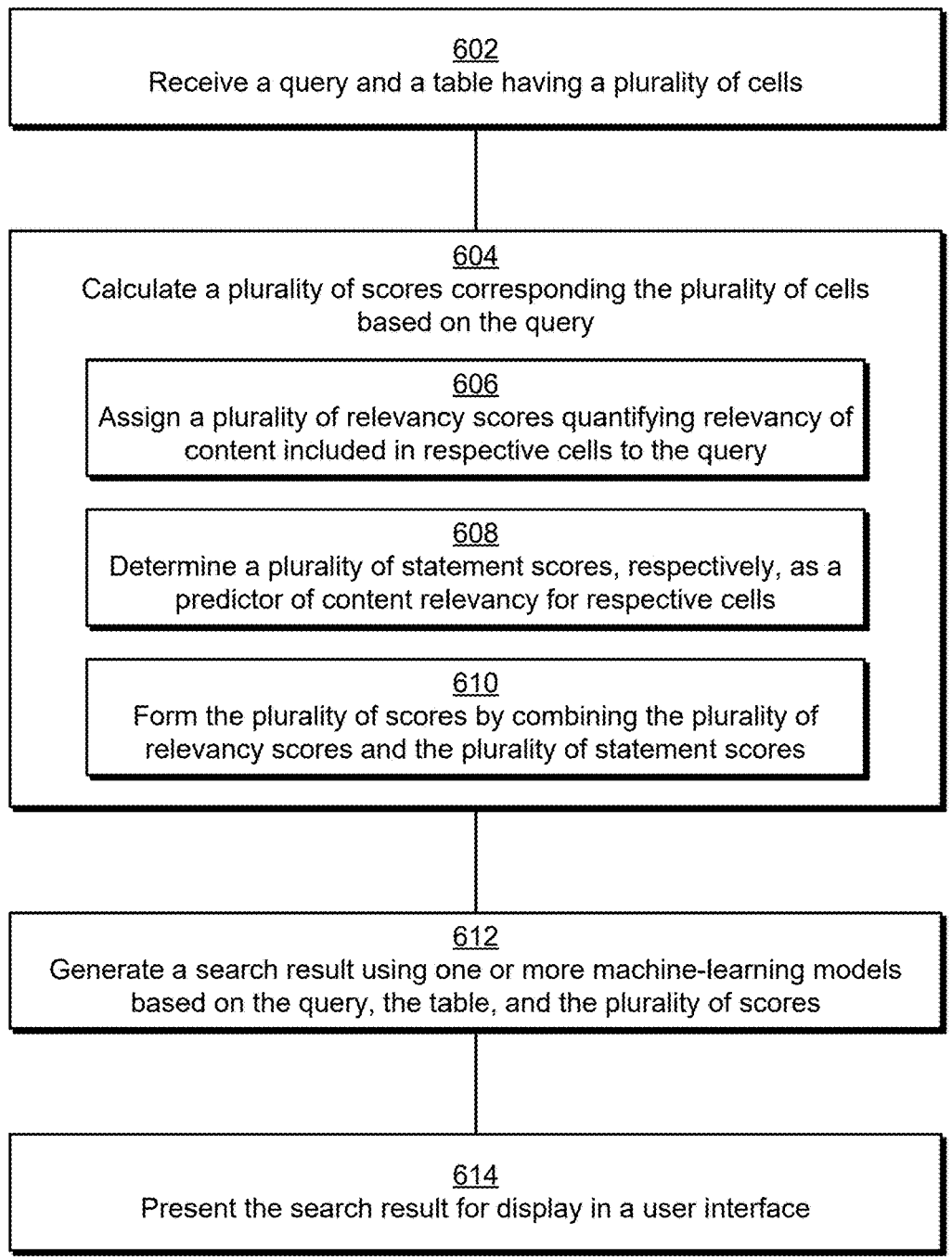
FIG. 6 is a flow diagram depicting a step-by-step procedure in an example implementation of operations performable by a processing device for accomplishing a result of table query answering based on content relevance.

The following discussion describes search techniques as part of question answering for tables that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm. FIG. 6 is a flow diagram 600 depicting a step-by-step procedure in an example implementation of operations performable by a processing device for accomplishing a result of table query answering based on content relevance. In portions of the following discussion, reference will be made in parallel to FIG. 6.

Figure 2:
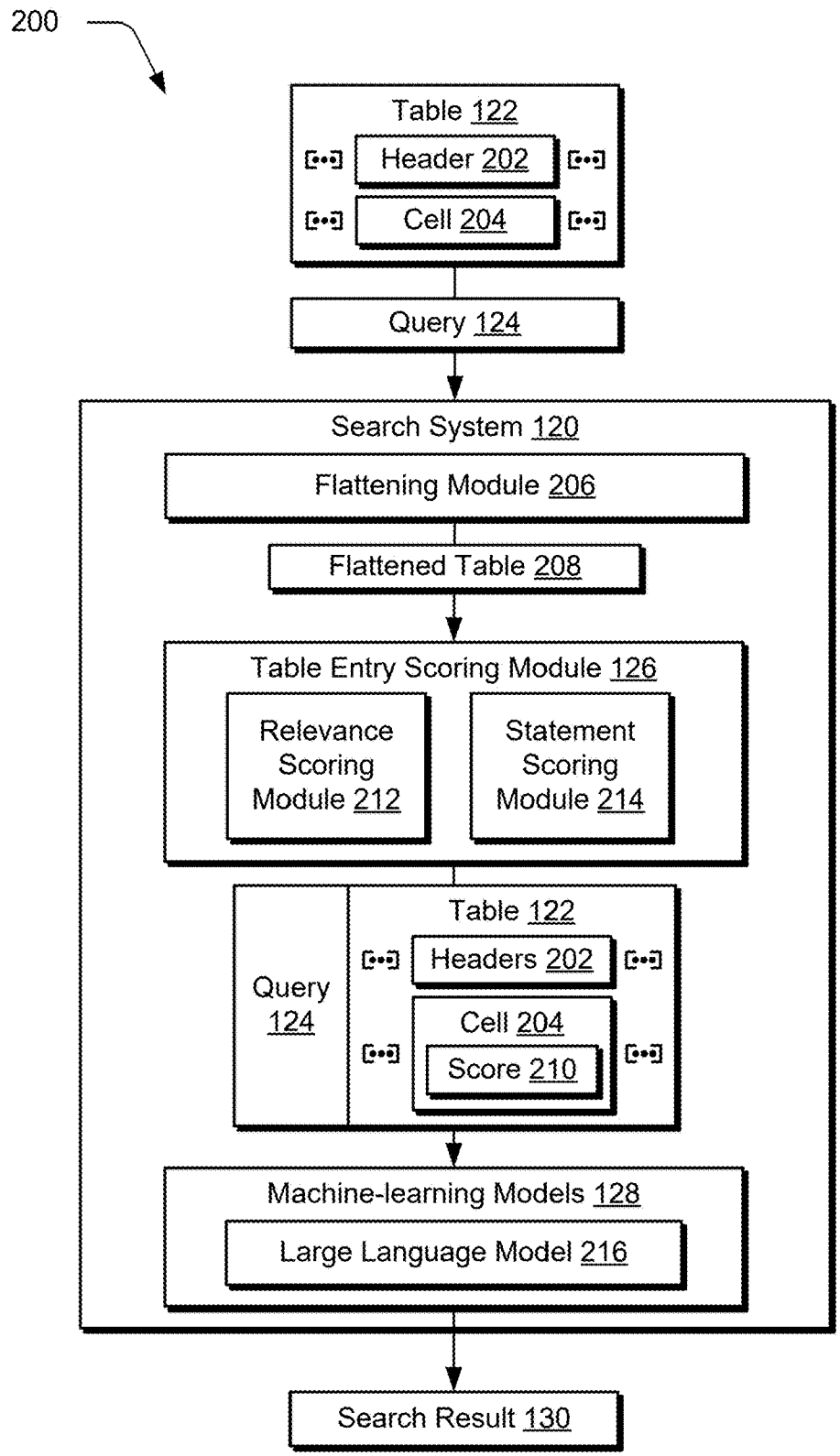
FIG. 2 depicts a system showing operation of a search system of FIG. 1 in greater detail as processing a table and a query to generate a search result as an answer to a question.

FIG. 2 depicts a system 200 showing operation of the search system 120 of FIG. 1 in greater detail as processing a table 122 and a query 124 to generate a search result 130 as an answer to a question. To do so, the search system 120 begins by receiving the table 122 and the query 124. The query 124, for instance, is input via a user interface and the table 122 is also selected as input via the user interface. The table 122 includes a header 202 that describes characteristics of cells 204 included in respective collections (e.g., rows and/or columns) in the table 122 (block 602).

A flattening module 206 is employed by the search system 120 to convert the table 122 into a form that is processible by the one or more machine-learning models 128. The flattening module 206, for instance, is configured to linearize the cells 204 into a sequence. The sequence, as a flattened table, is passed along with the query 124 to the table entry scoring module 126. The table entry scoring module 126 is configured to calculate a plurality of scores 210 corresponding to the plurality of cells 204 (and more particularly content included in the cells 204) based on the query 124 (block 604).

To do so in the illustrated system 200, the table scoring module 126 employs a two part process. The table scoring module 126 employs a relevance scoring module 212 that is configured to assign a plurality of relevancy scores that FIG. 1 quantify relevancy of content included in respective cells to the query (block 606). The table scoring module 126 is also configurable to employ, in parallel, a statement scoring module 214 that is configurable to determine a plurality of statement scores, respectively, as a predictor of content relevancy for respective cells (block 608). The relevancy scores and the statement scores are then combined by the table scoring module 126 to form the score 210 for respective cells 204 in the table 122 (block 610).

The score 210 is therefore usable to weight content included in the respective cell 204. Accordingly, the table 122 having the cells 204 along with the query 124 are passed to the machine-learning models 128 to generate the search result (block 612), which may then be presented for display in a user interface (block 614). A large language model 216 is illustrated as an example of the one or more machine-learning models 128 usable to generate the search result 130 although other examples are also contemplated.

As previously described, a large language model 216 is generally susceptible to noise, which in this instance corresponds to parts of the table 122 that are irrelevant towards answering the question posed by the query 124. Conventional techniques to address this technical challenge typically prune cells from the table 122, which causes removal of information that could potentially aid in accuracy of the search result 130 and thus accuracy in generating the answer to the question. Accordingly, the search system 120 is configured to employ the score 210 to focus operation of the large language model 216 to relevant cells and suppress consideration of extraneous content included in irrelevant cells of the table 122, which is not possible in conventional techniques.

Figure 3:
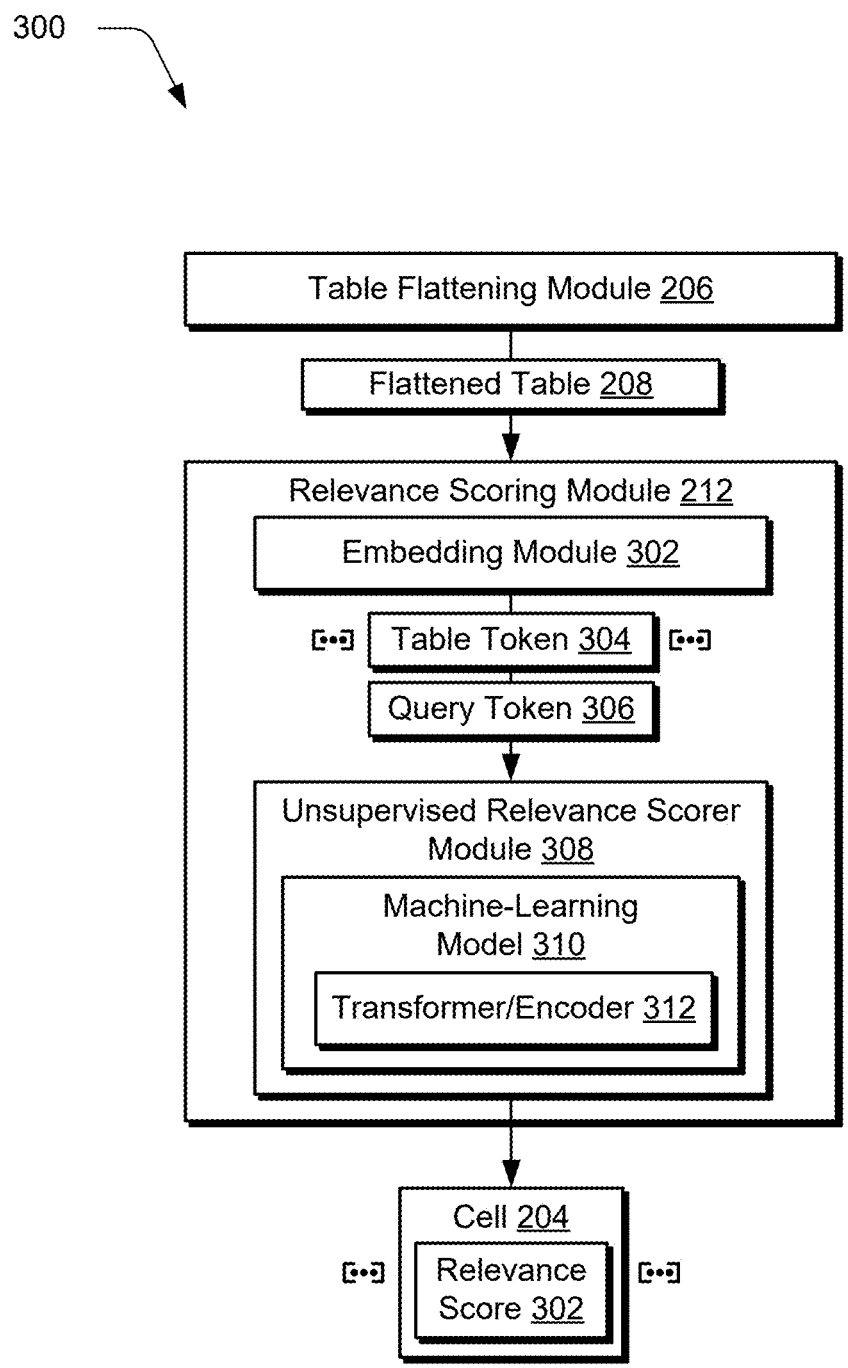
FIG. 3 depicts a system in an example implementation showing operation of a flattening module and relevance scoring module of FIG. 2 in greater detail.

FIG. 3 depicts a system 300 in an example implementation showing operation of the flattening module 206 and relevance scoring module 212 of FIG. 2 in greater detail. The flattening module 206, for instance, is employed to generate a flattened table 208 by linearizing the table 122. The relevance scoring module 212 is then employed to generate a relevance score 302 quantifying relevancy of content included in respective cells 204 of the table 122 to the query 124.

Due to the laborious nature of annotating table cells relevant to a specific question, the relevance scoring module 212 functions unsupervised and is trained in conjunction with the large language model 216 through answer generation loss. Formally, given a table "T" and a query (i.e., question) "Q" about "T," let "$Q_{tokens} = \{q_1, q_2, \ldots, g_{|Q|}\}$" denote the query tokens, and let "$T = \{c_{ij} | 1 \leq i \leq N_{row}, 1 \leq j \leq N_{col}\}$," where "$N_{row}$" and "$N_{col}$" represent a number of rows and columns in "T," respectively, with "$c_{ij}$" signifying content in a cell at the "$i^{th}$" row and "$j^{th}$" column. To prepare "T" for input to the one or more machine-learning models 128, the flattening module 206 employs a linearizing scheme to flatten the table 122 to form the flattened table 208 as follows:

$T_{flattened}$=[HEAD]: $c_{11}|c_{12}|\cdots|c_1 N_{col}$|[ROW]1: $c_{21}|\cdots$
 $|c_{2Ncol}|$[ROW]2: $\cdots$ Here, "[HEAD]" and "[ROW]k" denote the start of a column header row and a "$k^{th}$" data row, respectively. The pipe symbol "|" is used to separate special tokens and cell content. The embedding module 304 tokenizes the string to form table tokens 306 and query tokens 308.

The embedding module 304, for instance, is configurable using the underlying large language model 216 to obtain table tokens "$T_{tokens} = \{t_1, t_2, \ldots, t|T_{tokens}|\}$." The embedding module 304 concatenates "$T_{tokens}$" with "$Q_{tokens}$" to form "$I_{tokens} = (Q_{tokens}; T_{tokens})$," which is then provided as input to the unsupervised relevance scorer module 310. The unsupervised relevance scorer module 310 utilizes a machine-learning model 312, such as a transformer/encoder 314, to generate a contextualized representation "$h_p \in R_d$" for the "$p^{th}$" token.

The relevance scoring module 212 is configurable to predict a relevance score 302 for each table token 306. Since annotations for relevant table parts are not available, token relevance is treated as a latent variable. The relevance scoring module 212 is configurable to structure a representation space of table tokens 306 into two clusters, e.g., relevant and nonrelevant. Variational Inference (VI) is utilized to estimate latent variable probabilities and to group data points based on latent topics. To leverage this functionality, the relevance scoring module 212 is configurable to estimate relevance "$N_p^{uns}$" of table token 306:

$t_p(|Q_{tokens}|+1 \leq p \leq |Q_{tokens}|+|T_{tokens}|)$ as follows:

$$\mu_p = \phi_\mu(h_p); \sigma_p = \phi_\sigma(h_p)$$

$$N_p^{uns} = sigmoid(z_p); z_p = \mu_p + s * \sigma_p$$

Here, "s" is sampled from a standard normal distribution, and "$\phi_\mu$" and "$\phi_\sigma$" are fully connected (FC) layers with weights "$W_\mu \in R^{d \times 1}$" and "$W_\sigma \in R^{d \times 1}$" respectively. The sigmoid function normalizes the relevance score to the range of "0" to "1." The unsupervised relevance scorer module 310 structures a latent space "$TE_{URS}$" by clustering table tokens 306 into relevant and non-relevant categories using a clustering loss "$L_{clu}$." This clustering loss "$L_{clu}$" is applied to the latent representation "$h_p$" of tokens, tuning the transformer/encoder 314 for clustering. To further refine the clustering, a separation loss "$L_{sep}$" is enforced to increase a distance between unit vectors representing cluster centroids.

Additionally, the unsupervised relevance scorer module 310 is configurable to apply a sparsification loss "$L_{sparse}$" to ensure that relevance scores for table tokens 306 having relatively low relevance scores are clustered together in an irrelevant cluster. This is achieved by exponentiating the score logit "$z_p$" with a negative coefficient, pushing logit values for relevant and irrelevant clusters towards "∞" and "−∞," respectively, allowing a final score (after applying sigmoid) to approach "1" and "0:"

$$\mathcal{L}_{sparse} = \frac{1}{|\mathcal{T}_{tokens}|} \sum_p e^{-z_p^2}; |Q_{tokens}|+1 \leq p \leq |Q_{tokens}|+|\mathcal{T}_{tokens}|$$

When the question and table are input to a transformer/encoder "$TE_{QA}$" of the large language model 216, the embeddings corresponding to question tokens are used "as is," while the embedding of each table token 306 is multiplied by its corresponding relevance score 302:

$e_1, e_2, \cdots, e_{|I_{tokens}|} = \text{Embedding}_{QA}(I_{tokens})$ $e'_p = \eta_p \odot e_p; |Q_{tokens}|+1 \leq p \leq |Q_{tokens}|+|\mathcal{T}_{tokens}|$ $h'_1, \cdots, h'_{|\mathcal{I}_{tokens}|} = TE_{QA}(e'_1, e'_2, \cdots, e'_{|\mathcal{I}_{tokens}|})$ $a_1, a_2, \cdots, a_N = TD_{QA}(h'_1, \cdots, h'_{|\mathcal{I}_{tokens}|})$ In the above expressions, "⊙" symbolizes scalar multiplication with vector operation, and "$TD_{QA}$" represents the transformer/decoder of the large language model 216 that sequentially generates the answer tokens "$a_n$." "$TE_{URS}$," "$TE_{QA}$," and "$TD_{QA}$" are trained end-to-end through a cross-entropy loss "$L_{CE}$" between the generated and ground-truth answer tokens. Consequently, the total loss "L" is formulated as:

$L = L_{CE} + \lambda_{clu} * L_{clu} + \lambda_{sep} * L_{sep} + \lambda_{sparse} * L_{sparse}$ The answer generation loss serves as an indirect training signal for the one or more machine-learning models 128.

Figure 5:
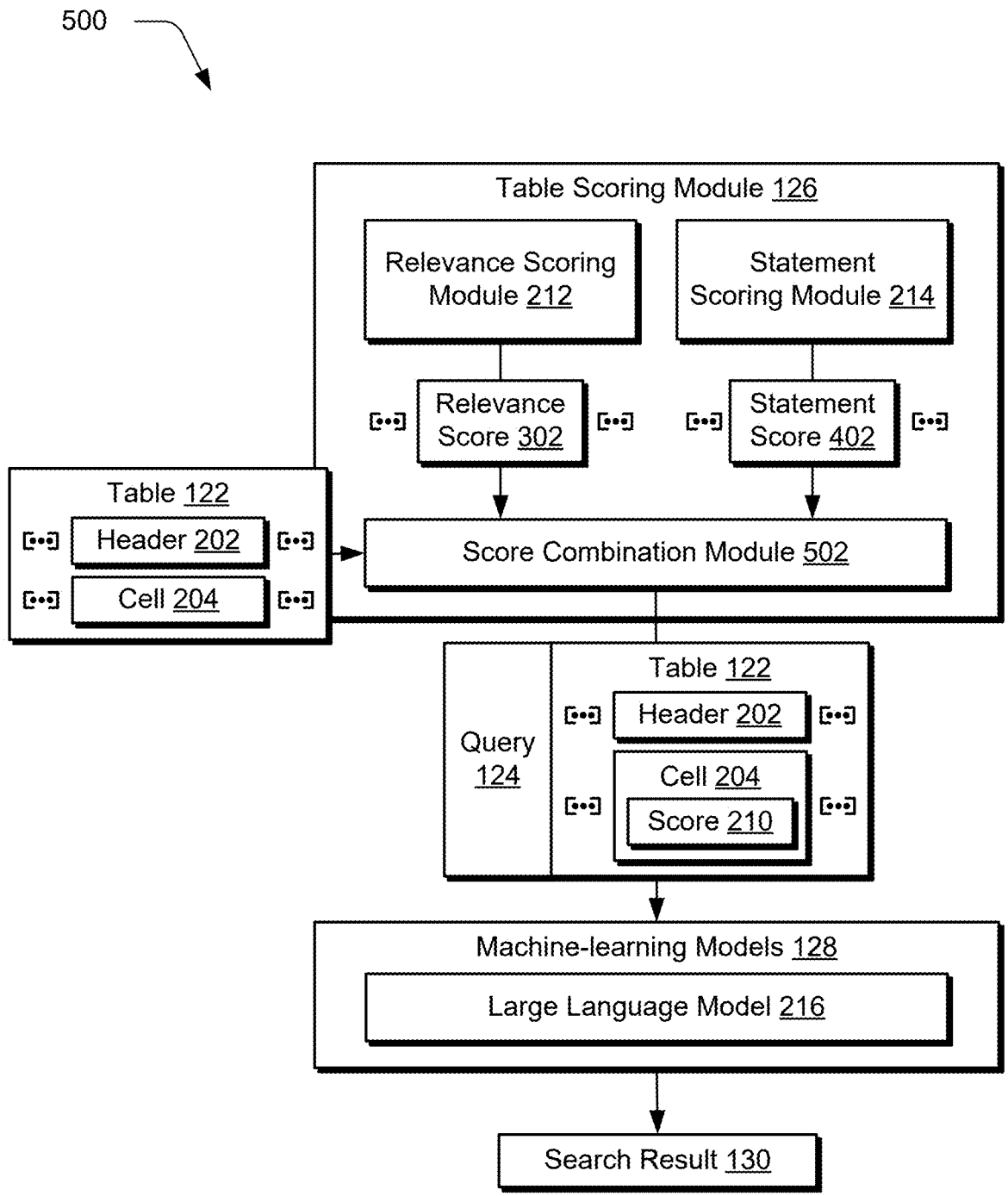
FIG. 5 depicts a system in an example implementation showing operation of a table scoring module of FIG. 2 in greater detail as generating a score through use of a score combination module by combining a relevance score from a relevance scoring module of FIG. 3 with a statement score of a statement scoring module of FIG. 4.

To support the relevance scoring module 212, the table scoring module 126 incorporates the statement scoring module 214 of FIG. 2 as a weakly-supervised module (trained separately from the unsupervised relevance scorer module 310 and large language model 216) that identifies relevant cells based on a parsing statement. Table tokens for these highlighted cells receive a cell-based score $$N_p^{cell},$$

which is combined with the unsupervised relevance score, $$N_p^{uns}$$

through a linear combination as further described in relation to FIG. 5 to generate a score 210 as a final relevance score "$\eta_p$":

$$\eta_p = \lambda_{uns} * \eta_p^{uns} + \lambda_{cell} * \eta_p$$

Figure 4:
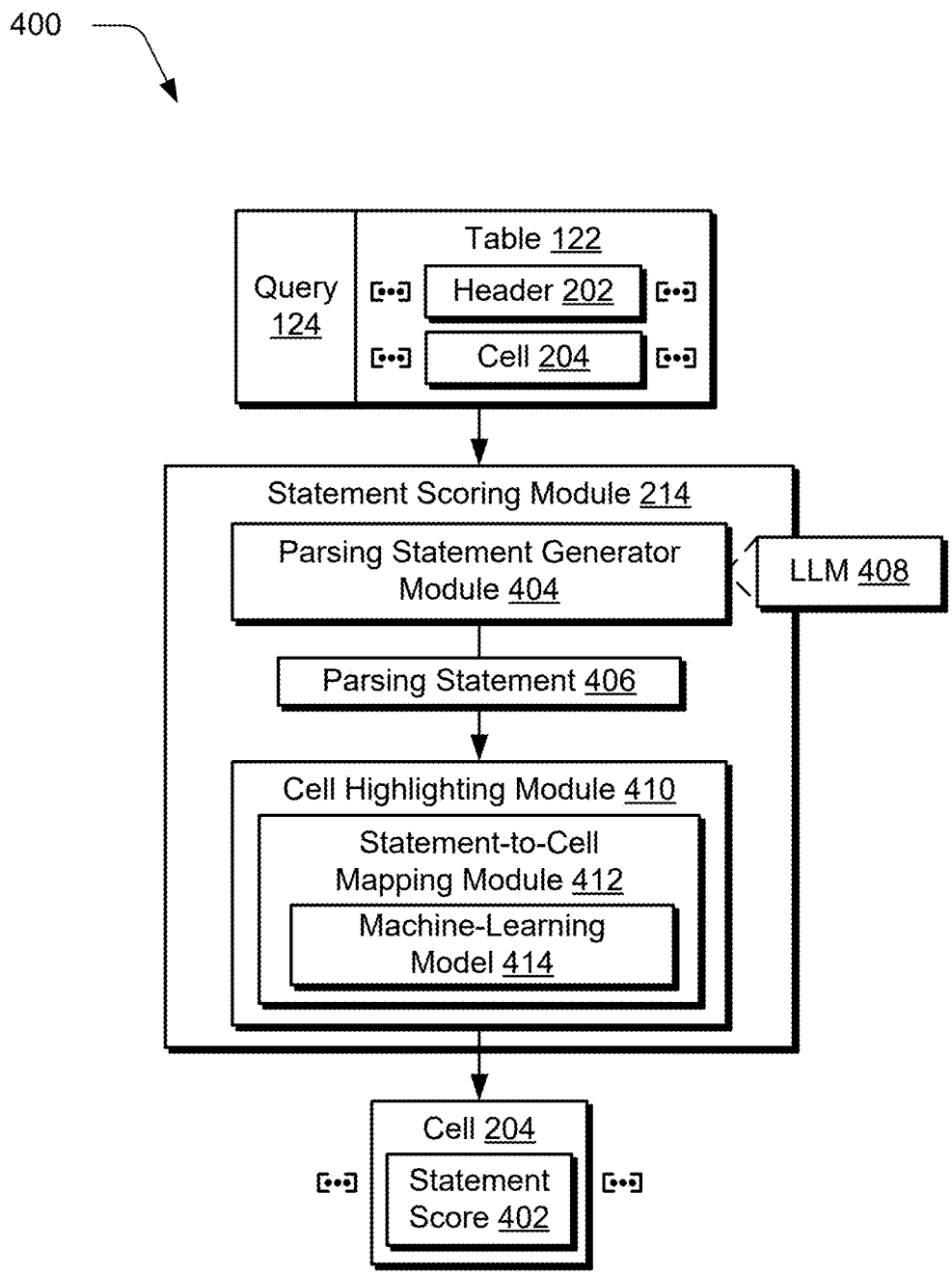
FIG. 4 depicts a system in an example implementation showing operation of a statement scoring module of FIG. 2 in greater detail.

FIG. 4 depicts a system 400 in an example implementation showing operation of the statement scoring module 214 of FIG. 2 in greater detail. The statement scoring module 214 is configured to generate a statement score 402 as a predictor of content relevancy for respective cells 204 of the table 122.

To do so, a parsing statement generation module 404 is configured to generate a parsing statement 406, e.g., using a LLM 408. The LLM 408 of the parsing statement generator module 404 is trained to generate the parsing statement 406 as natural language text that outlines criteria for rows and columns (e.g., of the headers 202 of the table 122) pertinent to a given question expressed by the query 124. The training process is initiated with a small set of manually annotated question-table pairs, which provide the foundational data for fine-tuning the LLM 408. Once trained, the parsing statement generator module 404 applies the LLM 408 to a question-table pair to create a parsing statement 406 that specifies 204 (e.g., by rows and/or columns) are relevant for deriving an answer to the question posed by the query 124.

A cell highlighting module 410 is then leveraged to identify significance of the plurality of cells towards meeting the one or more criteria. To do so, the cell highlighting module 410 utilizes a statement-to-cell mapping module 412, e.g., through operation of a machine-learning model 414 "Cell_Highlighter$_{LLM}$." The statement-to-cell mapping module 412 is configured to interpret the parsing statement 406 and identify cells within the table 122 that correspond to the described criteria of the parsing statement 406. This process results in the generation of a statement score 402 for each cell 204, reflecting a relative amount of the cell's relevance to the parsing statement 406.

To identify table cells for the criteria described in the parsing statement "text$_{parse}$," for instance, the statement-to-cell mapping module 412 is configured to map the parsing statement 406 to content of corresponding cells 204. To this end, the statement-to-cell mapping module 412 employs a machine-learning model 414 trained on a training dataset that contains samples of ("table," "list of highlighted cell coordinates") pairs. Each pair is accompanied by a text description summarizing content of the corresponding list of cells.

Once the machine-learning model 414 of the statement-to-cell mapping module 412 is trained, the table 122 and the parsing statement 406 "text$_{parse}$" are provided as inputs to identify and generate content of corresponding cells. More formally, $$c_1^{highlighted} \| \dots \| c_M^{highlighted} = \text{Cell\_Highlighter}_{LLM}(T, \text{text}_{parse})$$

where $$c_r^{highlighted}$$

represents a string of "$r^{th}$" highlighted cell predicted based on the parsing statement 406. "M" is a variable number and "||" is a delimiter to separate cell content. For "1≤r≤M," if $$c_r^{highlighted}$$

is a match with the content of some cell in "T," then the tokens "$t_p$" of matching cell is assigned a cell relevance score $$N_p^{cell}$$

of "1."

$$N_p^{cell}$$

is set to "0" for table tokens belonging to cells in "T" whose content does not match with $$c_r^{highlighted}.$$

The statement score 402 thus serves as an indicator of the cell's content relevancy in relation to the query 124, thereby facilitating the accurate weighting of cells 204 during the search process.

FIG. 5 depicts a system 500 in an example implementation showing operation of the table scoring module 126 of FIG. 2 in greater detail as generating a score 210 through use of a score combination module 502 by combining a relevance score 302 from the relevance scoring module 212 with a statement score 402 of a statement scoring module 214. Continuing with the above example, table tokens for highlighted cells from FIG. 4 receive a statement score 402 as a cell-based score $$N_p^{cell},$$

which is combined with a relevance score 302 as an unsupervised relevance score "$N_p^{uns}$" through a linear combination as follows:

$$\eta_p = \lambda_{uns} * \eta_p^{uns} + \lambda_{cell} * \eta_p$$

The combination is used to generate a score 210 as a final relevance score "$\eta_p$."

From this, the table scoring module 126 generates an input to the one or more machine-learning models 128 that includes the query 124, the table 122, and the score 210. The input is then processed by the one or more machine-learning models 128 (e.g., the large language model 216) to generate the search result 130 as an answer to a question posed by the query 124. The scores 210 are usable by the large language model 216 to weigh corresponding content in respective cells 204. As a result, the scores 210 focus operation of the large language model 216 on relevant content and suppress an effect of potentially irrelevant content and resulting noise on generation of the search result. Therefore, accuracy of the search result 130 is improved through an ability to process content of the table 122 as a whole and thus avoid inaccuracies of conventional techniques.

Example System and Device

Figure 7:
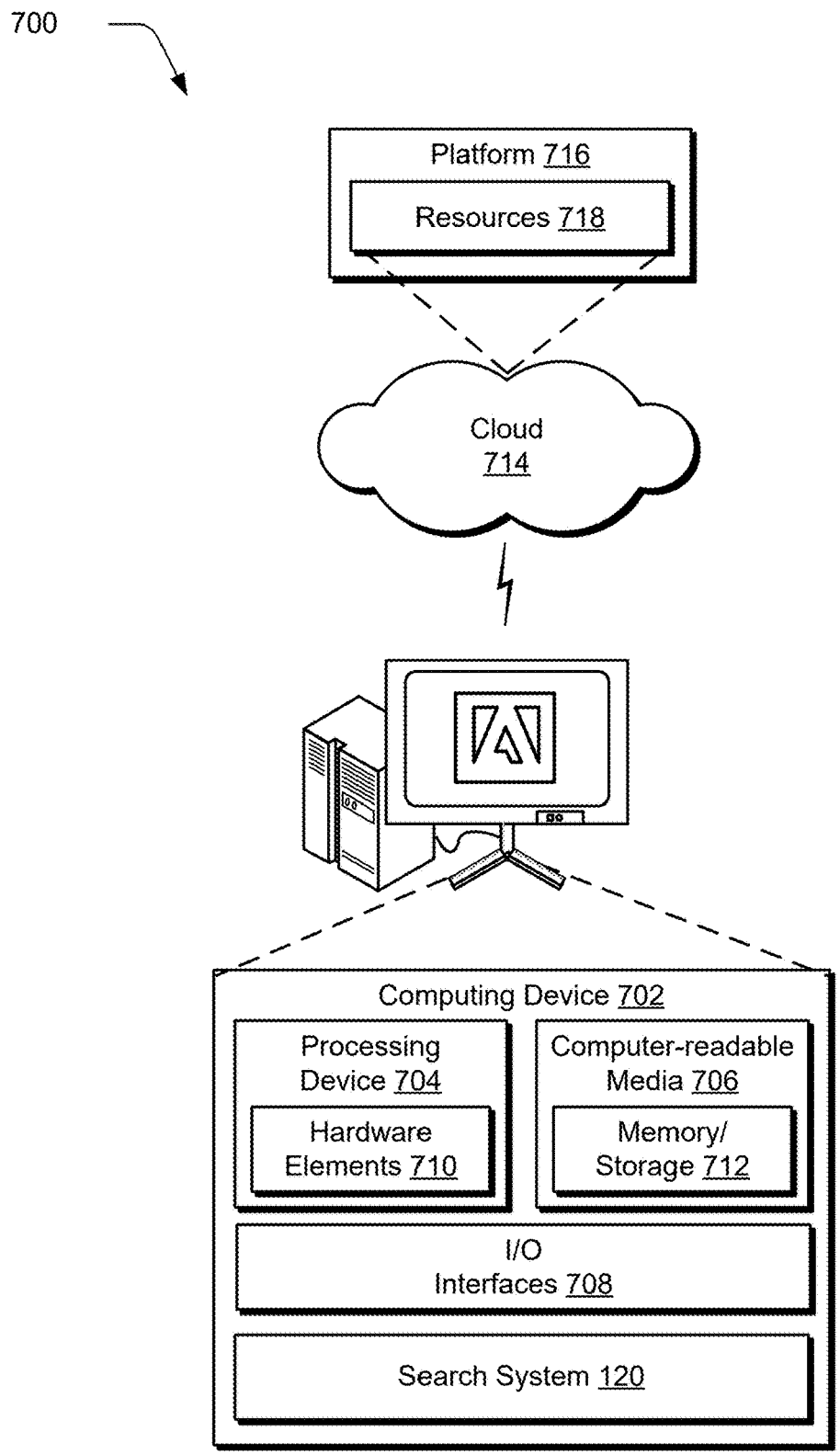
FIG. 7 illustrates an example system including various components of an example device that can be implemented as any type of computing device as described and/or utilize with reference to the previous figures to implement embodiments of the techniques described herein.

FIG. 7 illustrates an example system generally at 700 that includes an example computing device 702 that is representative of one or more computing systems and/or devices that implement the various techniques described herein. This is illustrated through inclusion of the search system 120. The computing device 702 is configurable, for example, as a server of a service provider, a device associated with a client (e.g., a client device), an on-chip system, and/or any other suitable computing device or computing system.

The example computing device 702 as illustrated includes a processing device 704, one or more computer-readable media 706, and one or more I/O interface 708 that are communicatively coupled, one to another. Although not shown, the computing device 702 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 704 is representative of functionality to perform one or more operations using hardware. Accordingly, the processing device 704 is illustrated as including hardware element 710 that is configurable as processors, functional blocks, and so forth. This includes implementation in hardware as an application specific integrated circuit or other logic device formed using one or more semiconductors. The hardware elements 710 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 706 is illustrated as including memory/storage 712 that stores instructions that are executable to cause the processing device 704 to perform operations. The computer-readable storage medium is configured for storing instructions that, responsive to execution by the processing device, causes the processing device to perform operations. The memory/storage 712 represents memory/storage capacity associated with one or more computer-readable media. The memory/storage 712 includes volatile media (such as random access memory (RAM)) and/or nonvolatile media (such as read only memory (ROM), Flash memory, optical disks, magnetic disks, and so forth). The memory/storage 712 includes fixed media (e.g., RAM, ROM, a fixed hard drive, and so on) as well as removable media (e.g., Flash memory, a removable hard drive, an optical disc, and so forth). The computer-readable media 706 is configurable in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 702. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 702, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 710. The computing device 702 is configured to implement particular instructions and/or functions corresponding to the software and/or hardware modules. Accordingly, implementation of a module that is executable by the computing device 702 as software is achieved at least partially in hardware, e.g., through use of computer-readable storage media and/or hardware elements 710 of the processing device 704. The instructions and/or functions are executable/operable by one or more articles of manufacture (for example, one or more computing devices 702 and/or processing devices 704) to implement techniques, modules, and examples described herein.

The techniques described herein are supported by various configurations of the computing device 702 and are not limited to the specific examples of the techniques described herein. This functionality is also implementable all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 include applications and/or data that can be utilized while computer processing is executed on servers that are remote from the computing device 702. Resources 718 can also include services provided over the Internet and/or through a subscriber network, such as a cellular or Wi-Fi network.

The platform 716 abstracts resources and functions to connect the computing device 702 with other computing devices. The platform 716 also serves to abstract scaling of resources to provide a corresponding level of scale to encountered demand for the resources 718 that are implemented via the platform 716. Accordingly, in an interconnected device embodiment, implementation of functionality described herein is distributable throughout the system 700. For example, the functionality is implementable in part on the computing device 702 as well as via the platform 716 that abstracts the functionality of the cloud 714.

In implementations, the platform 716 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, a query and a table having a plurality of cells;
   calculating, by the processing device, a plurality of scores corresponding to the plurality of cells based on the query by a machine-learning model, the plurality of scores weighting an amount of relevancy of respective said cells to the query, respectively;
   passing, by the processing device, the query, the table, and the plurality of scores as an input to a large language model (LLM);
   receiving, by the processing device, a search result from the large language model (LLM) generated by processing the query, the table, and the plurality of scores as weighting the amount of relevancy of respective said cells to the query, respectively; and
   presenting, by the processing device, the search result for display in a user interface.

2. The method as described in claim 1, wherein the calculating the plurality of scores includes assigning a plurality of relevancy scores quantifying the amount of relevancy of content included in respective said cells to the query.

3. The method as described in claim 2, wherein the assigning the plurality of relevance scores includes generating a plurality of table tokens by tokenizing the content of the cells and assigning the relevancy scores using the machine-learning model to each said table token based on query token generated from the query.

4. The method as described in claim 3, wherein the assigning using the machine-learning model is performed using a transformer/encoder.

5. The method as described in claim 1, wherein the calculating the plurality of scores includes forming a flattened table by flattening the table using a linearizing technique.

6. The method as described in claim 1, wherein the calculating the plurality of scores includes determining a plurality of statement scores, respectively, as a predictor of content relevancy for respective said cells.

7. The method as described in claim 6, wherein the determining the plurality of statement scores includes:
   forming at least one parsing statement that defines one or more criteria based on the query and the table; and
   identifying significance of the plurality of cells towards meeting the one or more criteria.

8. The method as described in claim 7, wherein the forming is performed using a machine-learning model.

9. The method as described in claim 1, wherein the calculating the plurality of scores includes:
   assigning a plurality of relevancy scores quantifying relevancy of content included in respective said cells to the query;
   determining a plurality of statement scores as a predictor of content relevancy for respective said cells; and
   forming the plurality of scores by combining the plurality of relevancy scores and the plurality of statement scores.

10. A computing device comprising:
    a processing device; and
    a computer-readable storage medium storing instructions that, responsive to execution by the processing device, causes the processing device to perform operations including:
      receiving a query and a table having a plurality of cells;
      assigning a plurality of relevancy scores quantifying relevancy of content included in respective said cells to the query;
      determining a plurality of statement scores as a predictor of content relevancy for respective said cells to the query;
      forming a plurality of scores by combining the plurality of relevancy scores and the plurality of statement scores; and
      generating a search result using one or more machine-learning models based on the query, the table, and the plurality of scores.

11. The computing device as described in claim 10, wherein the assigning the plurality of relevance scores includes generating a plurality of table tokens by tokenizing the content of the cells and assigning the relevancy scores using a machine-learning model to each said table token based on a query token generated from the query.

12. The computing device as described in claim 10, wherein the determining the plurality of statement scores includes:
    forming at least one parsing statement that defines one or more criteria based on the query and the table; and
    identifying significance of the plurality of cells towards meeting the one or more criteria.

13. The computing device as described in claim 12, wherein the forming is performed using a machine-learning model.

14. The computing device as described in claim 10, wherein the generating of the search result is performed by the machine-learning model configured as a large language model (LLM).

15. One or more computer-readable storage media storing instructions that, responsive to execution by a processing device, causes the processing device to perform operations comprising:
    receiving a query and a table having a plurality of cells;
    calculating a plurality of scores corresponding to the plurality of cells based on the query by a machine-learning model, the plurality of scores quantifying an amount of relevancy of respective said cells to the query, respectively;
    passing, by the processing device, the query, the table, and the plurality of scores as an input to a large language model (LLM);
    receiving a search result from the large language model (LLM) generated by processing the query, the table, and the plurality of scores quantifying the amount of relevancy of respective said cells to the query, respectively.

16. The one or more computer-readable storage media as described in claim 15, wherein the calculating the plurality of scores includes assigning a plurality of relevancy scores quantifying relevancy of content included in respective said cells to the query.

17. The one or more computer-readable storage media as described in claim 16, wherein the assigning the plurality of relevance scores includes generating a plurality of table tokens by tokenizing the content of the cells and assigning the relevancy scores using a machine-learning model to each said table token based on query token generated from the query.

18. The one or more computer-readable storage media as described in claim 15, wherein the calculating the plurality of scores includes determining a plurality of statement scores, respectively, as a predictor of content relevancy for respective said cells.

19. The one or more computer-readable storage media as described in claim 18, wherein the determining the plurality of statement scores includes:
    forming at least one parsing statement that defines one or more criteria based on the query and the table; and
    identifying significance of the plurality of cells towards meeting the one or more criteria.

20. The one or more computer-readable storage media as described in claim 15, wherein the calculating the plurality of scores includes:
    assigning a plurality of relevancy scores quantifying relevancy of content included in respective said cells to the query;
    determining a plurality of statement scores as a predictor of content relevancy for respective said cells; and
    forming the scores by combining the plurality of relevancy scores and the plurality of statement scores.

* * * * *